3,361,696
WATER-BASED ADDITION POLYMER
Nicholas C. Bolgiano, East Hempfield Township, Lancaster County, and Ardell R. Spang, Lebanon, Pa., assignors to Armstrong Cork Company, Lancaster, Pa., a corporation of Pennsylvania
No Drawing. Filed May 13, 1964, Ser. No. 367,221
6 Claims. (Cl. 260—29.7)

ABSTRACT OF THE DISCLOSURE

Water-based emulsion polymer curable to flexible, tough films at low temperatures.

---

This invention relates to a water-based emulsion polymer, and more particularly to such polymers which may be curable at relatively low temperatures. Still more particularly the invention relates to such polymers which in the cured condition form superior films and coatings which are flexible and yet which have excellent gloss, soil and abrasion resistance, coupled with high strength, good color stability, and excellent water and solvent resistance.

Although addition polymers having a wide variety of properties have been prepared in the past, there remains a need for water-based emulsion compositions which can be used to form coatings which will easily cure into flexible, tough films. Such cured films are in a thermoset condition by virtue of being intensely cross-linked under relatively mild conditions.

It is the primary object of the present invention to supply such a polymer. It is a further object of the present invention to supply a curable, water-based emulsion system which when subjected to a relatively low degree of heat after being applied to a suitable substrate will cure to form a thin, stable, flexible, tough film.

These objects are achieved by a curable polymer comprising 15–90% by weight of an alkyl acrylate selected from the group consisting of the 1–8 carbon alkyl group monoesters of acrylic and methacrylic acids. The polymer also contains 1–20% by weight of a hydroxy-alkyl acrylate selected from the group consisting of 2-hydroxy ethyl acrylate, 2-hydroxy propyl acrylate, the corresponding methacrylates thereof, and alpha-methylol ethyl acrylate. Finally, the polymer includes 0.5–8% by weight of a polyethylenically unsaturated compound selected from the group consisting of divinyl benzene, diallyl fumarate, and the glycol diesters prepared by the reaction of mono, di, tri, and tetra ethylene, propylene, and butylene glycol with acrylic and methacrylic acids. As a preferred embodiment, the polymer will also contain copolymerized with the above-stated ingredients 10–60% by weight of styrene or a ring-substituted styrene.

In accordance with this invention, only the above-defined ingredients in the amounts stated will yield the water-based curable polymer which, on curing, will form the highly desirable film described earlier. In making the polymer, a mixture of water and the usual surface-active agents (emulsifiers) may be purged with nitrogen for a sufficient period of time to remove the air. If desired, a portion of the pre-mixed monomers may be added to the water system at this time. After purging, the temperature will be raised to 30–80° C. Water-soluble catalysts such as ammonium persulfate and sodium bisulfite will be added to initiate polymerization. If needed, a trace of an activator such as ferrous sulfate may be used. Other water-soluble catalysts which will initiate the polymerization are potassium persulfate, hydrogen peroxide, and water-soluble sulfoxy and phosphate compounds, such as sodium formaldehyde sulfoxylate, sodium thiosulfate, sodium hydrosulfite, and sodium pyrophosphate. Any remaining monomer mixture will then be added slowly over a period of time, with stirring. Additional catalysts may be dissolved in water and added during the reaction period. The reaction will be completed after a period of 1–5 hours, or when the conversion of monomer to polymer is complete. The emulsion is then allowed to cool to room temperature with continued stirring. The emulsion is preferably stabilized in the pH range 8–9.5 by the addition of ammonium hydroxide.

The solids content of the emulsion will be determined by the mount of water relative to the amount of polymerized monomers and other nonvolatile components used in making the polymer. The emulsion will generally contain solids in the range of 20–55% by weight, and more preferably, for purposes of coating glass, metal, felts, and other subtrates, the solids content will be in the range of 35–50% by weight.

In use, a curing agent will be added to the emulsion polymer prepared as described above. The curing agent is preferably an aminoplast resin such as a melamine or a urea formaldehyde resin. Additional examples of the curing agents are benzoguanamine formaldehyde resins and triazine formaldehyde resins. These crosslinking agents will be added to the polymer emulsion in the amounts of about 0.5–15% by weight of the polymer itself. The crosslinking agents appear to function by reacting with the polymers at the site of the hydroxyl groups. It is for this reason that the presence of the hydroxyl-containing alkyl esters of the acrylic acid or methacrylic acid is so important in the amounts stated. The type of bonding formed by the described crosslinking agents and the hydroxyl groups on the polymers is such as to produce the strong yet flexible film of the invention.

The alkyl acrylates include methyl acrylate and methacrylate up to octyl acrylate and methacrylate, and preferably 2-ethylhexyl acrylate.

The hydroxy-alkyl acrylates include 2-hydroxy ethyl methacrylate, which is the preferred compound. 2-hydroxy propyl acrylate and methacrylate, 2-hydroxy ethyl acrylate, and alpha-methylol ethyl acrylate comprise the balance of the usable hydroxy-alkyl acrylates.

The polyfunctional compound in addition to divinyl benzene and diallyl fumarate will be difunctional acrylate esters which are the reaction products of mono, di, tri, and tetra ethylene glycol, propylene glycol, or butylene glycol, with acrylic acid or methacrylic acid, the acid being used in sufficient amounts to form the diester.

The following examples illustrate several embodiments of the invention. All parts and percentages are by weight unless otherwise stated.

EXAMPLE 1

The following ingredients were used in the amounts stated to form a polymer.

| Ingredients: | Parts |
|---|---|
| Butyl methacrylate | 157.5 |
| 2-hydroxy ethyl methacrylate | 14.0 |
| 1,3-butylene glycol dimethacrylate | 3.5 |
| Octyl phenyl polyethoxy ethanol | 4.6 |
| Nonyl phenyl polyethoxy ethanol | 3.2 |
| Sodium lauryl sulfate | 2.5 |
| Water | 213.3 |
| $(NH_4)_2S_2O_8$ | 1.0 |
| Sodium metabisulfite | 0.8 |

In making the polymer, all the monomers were combined. Into a flask was placed the water, the emulsifiers, and 50 parts of the monomer mixture. The system was sparged for nitrogen for half an hour and then the temperature was raised to 35° C. The sodium metabisulfite was then added along with 0.83 parts $(NH_4)_2S_2O_8$. When the exotherm reached 45° C., which took about 15 minutes, the remaining monomers were added dropwise over a period of 1 to 1½ hours. The remaining 0.17 part of $(NH_4)_2S_2O_8$ was dissolved in 6 parts water and added intermittently during the polymerization. All additions were carried out with continuous stirring. The reaction mixture was cooled to room temperature and ammonium hydroxide was added to take the pH to the range 9–9.5. The mixture was then filtered through a cheesecloth. The solids content was 44.4%.

To 100 parts of this latex were added 2.6 parts hexamethoxy methyl melamine and 7 parts of a 7.8% poly(vinyl alcohol) solution hydrolyzed to the extent of 86–89%. The mixture was drawn down on a glass plate to form a film. The film was cured for one hour at 190° F. and then an additional hour at 250° F. A clear, strongly adherent film resulted.

EXAMPLE 2

A polymer was prepared as in Example 1 using the following ingredients in the amounts stated.

| Ingredients: | Parts |
|---|---|
| Styrene | 98.9 |
| 2-ethylhexyl acrylate | 61.2 |
| Alpha-methylol ethyl acrylate | 14.0 |
| 1,3-butylene glycol dimethacrylate | 0.9 |
| Octyl phenyl polyethoxy ethanol | 4.6 |
| Nonyl phenyl polyethoxy ethanol | 3.2 |
| Water | 213.3 |
| $(NH_4)_2S_2O_8$ | 1.0 |
| Sodium metabisulfite | 0.8 |

The percent solids was 44.7%. To 100 parts of the latex were added 2.6 parts of the hexamethoxy methyl melamine, 7 parts of the 7.8% poly(vinyl alcohol) solution, and 1.52 parts of buffered zinc chloride as an accelerator. The resulting composition was laid down as a film on glass and was cured for one hour at 190° F., to give a tough, strong, glossy, flexible film.

EXAMPLE 3

The following ingredients were formed into a polymeric water-based latex as in Example 1.

| Ingredients: | Parts |
|---|---|
| Styrene | 98.0 |
| 2-ethylhexyl acrylate | 59.5 |
| 2-hydroxy propyl acrylate | 14.0 |
| Divinyl benzene | 3.5 |
| Octyl phenyl polyethoxy ethanol | 4.6 |
| Nonyl phenyl polyethoxy ethanol | 3.2 |
| Water | 213.3 |
| $(NH_4)_2S_2O_8$ | 1.0 |
| Sodium bisulfite | 0.8 |

The solids content was 42.2%. One hundred parts of the latex were formulated with 2.6 parts hexamethoxy methyl melamine and 7 parts of the 7.8% poly(vinyl alcohol) solution. A film of this composition was cured on glass for one hour at 250° F., forming a clear, tough, strong film.

EXAMPLE 4

The following ingredients were formulated into a latex as in Example 1.

| Ingredients: | Parts |
|---|---|
| Styrene | 91.9 |
| 2-ethylhexyl acrylate | 56.0 |
| 2-hydroxy ethyl methacrylate | 14.0 |
| Ethylene glycol dimethacrylate | 13.1 |
| Octyl phenyl polyethoxy ethanol | 4.6 |
| Nonyl phenyl polyethoxy ethanol | 3.2 |
| Water | 426.5 |
| $(NH_4)_2S_2O_8$ | 1.0 |
| Sodium metabisulfite | 0.8 |

The solids content was 29.7%. One hundred parts of the latex were formulated with 1.7 parts hexamethoxy methyl melamine, 7 parts of the 7.8% poly(vinyl alcohol) solution, and 1 part of buffered zinc chloride accelerator.

A film was prepared on glass and cured at 190° F. for one hour to form a hard, glossy film.

EXAMPLE 5

The following ingredients were used to make a polymer.

| Ingredients: | Parts |
|---|---|
| Deionized water | 310.0 |
| Vinyl toluene | 50.5 |
| 2-ethylhexyl acrylate | 176.9 |
| Allyl acrylate | 5.1 |
| 2-hydroxy propyl methacrylate | 20.2 |
| Sodium metabisulfite | 1.2 |
| Ammonium persulfate | 1.5 |
| Octyl phenyl polyethoxy ethanol | 3.4 |
| Nonyl phenyl polyethoxy ethanol | 2.4 |

The polymer was made by mixing the water, surfactants, and ⅓ of the pre-mixed monomers and placing in a flask and purging with nitrogen for 30 minutes. The mixture was then heated to 35° C. and was stirred while the initiators (ammonium persulfate and sodium metabisulfite) were added along with a trace of ferrous sulfate activator. After 15 minutes the temperature rose to 45° C. and the remainder of the monomer mixture was added during 90 minutes. During this time the temperature was maintained at 45–50° C. When addition was complete, the product was cooled to room temperature and filtered through cheesecloth to remove about 0.5 part of coagulant. The filtrate, which had a pH of 3.0, was neutralized to a pH of 8.0 with concentrated ammonium hydroxide. The solids content was 45.5%.

To one 100 part portion of the latex were added 2.6 parts of hexamethoxy methyl melamine. To a second 100 part portion of the latex was added 2.2 parts of a urea-formaldehyde condensation product as a 75% solution in water.

Both compositions were spread on glass plates using a 6 mil Bird blade and the films were oven heated at 250° F. for 30 minutes in air. The cured films were more resistant to acetone and had less tack than an identical film prepared by omitting the curing agents.

A portion of the latex to be cured was hexamethoxy methyl melamine weighing 25 parts was diluted with 50 parts of water and was used to saturate a 2.81 part sample of an asbesto-rayon nonwoven fabric. The saturated fabric was heated in an over at 250° F. for 30 minutes and after cooling weighed 4.7 parts. The cooled fabric had improved tensile strength and wet strength resistance.

EXAMPLE 6

The following two polymers were prepared.

| Ingredients | Parts | |
|---|---|---|
|  | 1 | 2 |
| Deionized Water | 337.0 | 350.0 |
| Styrene | 118.8 | 204.7 |
| 2-ethylhexyl Acrylate | 80.0 | 37.9 |
| 2-hydroxy Ethyl Methacrylate | 51.0 | 2.5 |
| 1,3-butylene Glycol Dimethacrylate | 5.0 | 7.6 |
| Ammonium Persulfate | 1.8 | 1.8 |
| Sodium Lauryl Sulfate | 33.8 | 33.8 |

Number 1 has a solids content of 42.1 and number 2 has a solids content of 41.2.

In making these two polymers, a mixture of the water and the sodium lauryl sulfate was purged with nitrogen and heated to 75° C. While stirring, the initiator (ammonium persulfate) was added followed by the slow addition of the premixed monomers. Monomer addition required three hours. During this time the temperature was maintained at 75–80° C. After addition was complete, the product was stirred for an additional hour and was then cooled to room temperature, filtered through cheesecloth, and neutralized to a pH of 8.0 with 5% ammonium hydroxide.

To 100 parts of Run 1 was added 5.7 parts by weight of hexamethoxy methyl melamine, while to 100 parts by weight of Run 2 was added 0.5 part by weight of hexamethoxy methyl melamine.

Drawdowns of the resulting mixtures were made on glass plates which were then oven heated at 250° F. for 45 minutes to produce tough films. After curing, Run 1 had a pencil hardness of 3H–4H, and was more resistant to acetone and had greater tensile strength than the film of Run 2.

EXAMPLE 7

The following ingredients were formed into a latex.

Ingredients:                                         Parts
    Water _____ 930
    Styrene _____ 424
    2-ethylhexyl acrylate _____ 258
    2-hydroxy ethyl methacrylate _____ 61
    1,3-butylene glycol dimethylacrylate _____ 15
    Sodium metabisulfite _____ 3.5
    Ammonium persulfate _____ 4.5
    Octyl phenyl polyethoxy ethanol _____ 10.0
    Nonyl phenyl polyethoxy ethanol _____ 7.0

The latex was neutralized to a pH of 8.0 with concentrated ammonium hydroxide.

The latex, 1,741 parts, containing the poly(vinyl alcohol), 38.5 parts (8%), was admixed in an amount of 1,646 parts with 335 parts of titanium dioxide by ball milling for 24 hours. Subsequently, 354 parts of the pigmented composition was admixed with 7.3 parts of hexamethoxy methyl melamine with stirring for one hour. An aluminum sheet was coated with this composition using a 3.5 mil blade and was then heated in the oven at 250° F. for one hour. The coating on the aluminum was glossy, hard, flexible, and had good adhesion to the metal.

A 12 x 12 piece of exterior prime siding was spray coated at the rate of 16 grams solid per square foot with this pigmented curable latex, and the product was heated in the oven to 250° F. for one hour. The cured coating had good adhesion, was hard, glossy, and durable.

EXAMPLE 8

The following polymers were made as described in Example 1, each polymer containing the following ingredients in the amounts indicated.

| Polymer | Percent Styrene | 2-ethyl-hexyl Acrylate | 2-hydroxy Methacrylate | Butylene Glycol Dimethacrylate | Diallyl Fumarate | Ethylene Glycol Dimethacrylate | Acrylonitrile |
|---|---|---|---|---|---|---|---|
| A | 59.5 | 32.3 | 8.2 | | | | |
| B | 58.3 | 31.7 | 8.0 | | 2.0 | | |
| C | 58.3 | 31.7 | 8.0 | 2.0 | | | |
| D | 57.2 | 31.1 | 7.9 | 3.8 | | | |
| E | 58.3 | 31.7 | 8.0 | | | 2.0 | |
| F | 56.7 | 30.8 | 7.8 | | | 4.7 | |
| G | 55.9 | 34.1 | 8.0 | 2.0 | | | |
| H | 54.8 | 33.5 | 7.9 | 3.8 | | | |
| I | 53.4 | 36.6 | 8.0 | 2.0 | | | |
| J | 52.5 | 35.8 | 7.9 | 3.8 | | | |
| K | 50.0 | 38.3 | 7.9 | 3.8 | | | |
| L | 57.0 | 34.8 | 8.2 | | | | |
| M | 55.9 | 17.1 | 8.0 | 2.0 | | | 17.0 |
| N | 38.8 | 34.1 | 8.0 | 2.0 | | | 17.1 |

On mixing with about 5% of hexamethoxy methyl melamine and curing for one hour at 190° F. all these polymers, except A and L, yielded tough, flexible, glossy coatings. Polymers A and L, having no difunctional monomer in the molecule, yielded brittle films with greatly reduced scratch resistance.

We claim:

1. A water-based emulsion polymer curable at low temperature consisting of 15–90% by weight of an alkyl acrylate selected from the group consisting of the 1–8 carbon alkyl group monesters of acrylic and methacrylic acids, 1–20% by weight of a hydroxy-alkyl acrylate selected from the group consisting of 2-hydroxy ethyl acrylate, 2-hydroxy propyl acrylate, the corresponding methacrylates thereof, and alpha-methylol ethyl acrylate, and 0.5–8% by weight of a polyethylenically unsaturated compound selected from the group consisting of divinyl benzene, diallyl fumarate, and the mono, di, tri, and tetra ethylene, propylene, and butylene glycol diesters of acrylic and methacrylic acids.

2. An amulsion polymer according to claim 1 wherein said alkyl acrylate comprises 2-ethylhexyl acrylate.

3. A water-based emulsion polymer according to claim 1 wherein said hydroxy alkyl acrylate comprises 2-hydroxy ethyl methacrylate.

4. A water-based emulsion polymer according to claim 1 wherein said polyethylenically unsaturated compound comprises 1,3-butylene glycol dimethacrylate.

5. A cured, water-based emulsion polymer according to claim 1.

6. An article comprising a solid substrate carrying adhered to a surface thereof a coating comprising the cured polymer of claim 1.

References Cited

UNITED STATES PATENTS

| 2,413,973 | 1/1947 | Howk | 260—89.5 |
| 2,819,237 | 1/1958 | Daniel | 260—29.4 |
| 3,104,231 | 9/1963 | Fitch | 260—29.7 |
| 3,200,099 | 8/1965 | Lewis et al. | 260—80.5 |

FOREIGN PATENTS

| 665,725 | 6/1963 | Canada. |

GEORGE F. LESMES, *Primary Examiner.*

SAMUEL H. BLECH, *Examiner.*

UNITED STATES PATENT OFFICE
CERTIFICATE OF CORRECTION

Patent No. 3,361,696            January 2, 1968

Nicholas C. Bolgiano et al.

It is hereby certified that error appears in the above numbered patent requiring correction and that the said Letters Patent should read as corrected below.

Column 2, line 12, for "mount" read -- amount --; column 4, line 45, for "was" read -- with --; line 48, for "asbesto" read -- asbestos --; line 49, for "over" read -- oven --; column 5, line 42, for "dimethylacrylate" read -- dimethacrylate --; column 6, line 38, for "monesters" read -- monoesters --; line 48, for "amulsion" read -- emulsion --.

Signed and sealed this 22nd day of April 1969.

(SEAL)
Attest:

Edward M. Fletcher, Jr.
Attesting Officer

EDWARD J. BRENNER
Commissioner of Patents